United States Patent Office 3,083,938
Patented Apr. 2, 1963

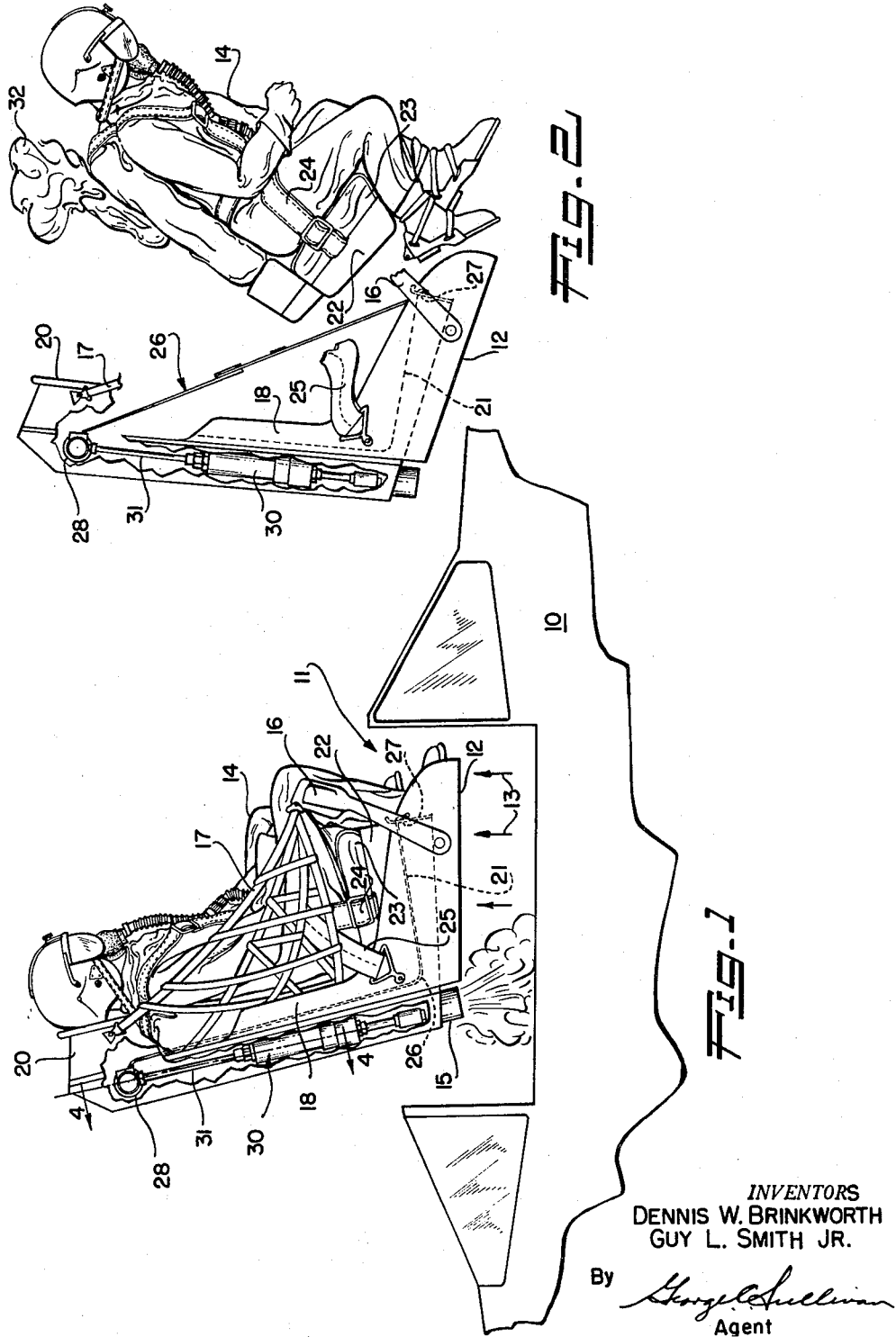

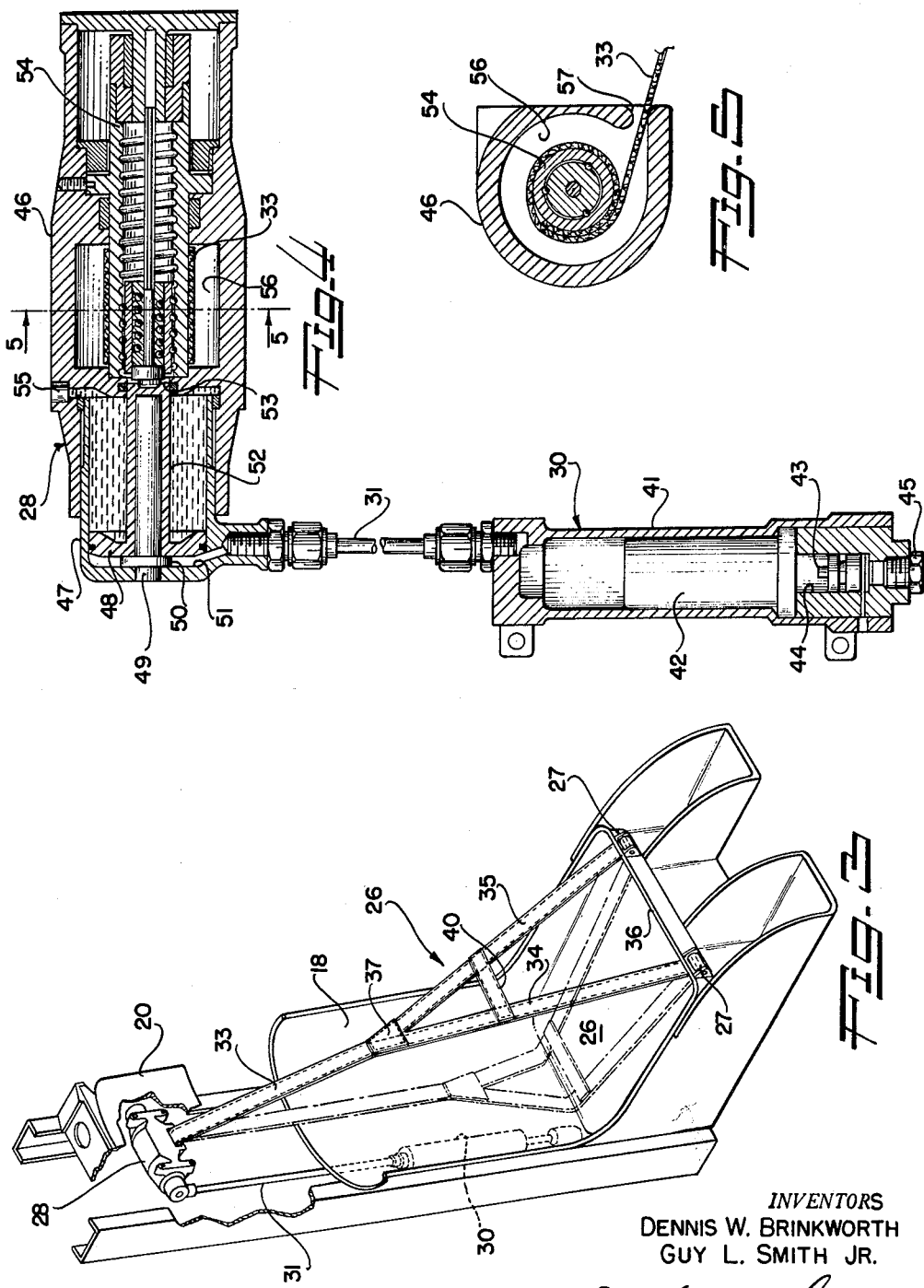

3,083,938
EJECTION SEAT AND PERSONNEL SEPARATION DEVICE
Dennis W. Brinkworth, Van Nuys, and Guy L. Smith, Jr., Glendale, Calif., assignors to Lockheed Aircraft Corporation, Burbank, Calif.
Filed Aug. 6, 1959, Ser. No. 832,001
9 Claims. (Cl. 244—122)

The present invention relates to aircraft escape systems and, more particularly, to means for separating the pilot or crew personnel from an ejected seat moving at high velocity when, in time of emergency, it becomes necessary for such personnel to depart from the aircraft in flight and to parachute down to earth.

Those skilled in the art know that until the development of high speed aircraft capable of speeds of 400 m.p.h. and more, it was not difficult for a person to exit from an airplane in flight in time of emergency by his own unaided efforts and to return to earth by parachute. In those days, the forces acting on a person to impede his exit from an airplane were not great enough to prevent a flier from overcoming them by his own muscular strength.

With the advent of high speed aircraft, however, emergency exit of personnel during flight could no longer be effected in the manner practiced heretofore. The main reason for this was the action of speed which generated forces, many times the force of gravity, which became so great as to make it exceedingly difficult, if not impossible for a flier to move himself out of the airplane or to separate himself from a seat by his own strength.

For these and other reasons, it has become necessary to equip aircraft capable of flying at high speeds with some means to provide for forcibly ejecting both personel and seat during flight. The use of such means made exit from the airplane possible without the necessity for the expenditure of any great amount of muscular energy. This has been accomplished in a manner which projects the seat, together with the occupant thereof, from the airplane with sufficient force and rapidity so as to eliminate the possibility of collision with the after structure of the airplane in the case of upward ejection, or the possibility of collision with landing gear and other equipment beneath the aircraft during downward ejection. Following ejection, the flier is required to separate himself from the seat and after the seat has fallen far enough away from him, a parachute may be deployed for his return to earth. Because of the forces and loads generated by high speed ejection, it has become exceedingly difficult for an ejected pilot to separate himself from the seat whereby it has happened that the deployed parachute becomes tangled with the seat and renders the parachute ineffective for its intended purpose.

Accordingly, the present invention provides a separation system and device for providing positive separation of a flier from an ejected seat during escape from his airplane which includes webbing that extends from the seat headrest down the back of the seat and extends beneath the flier to an attachment point at the front of the seat. The webbing is deployed or drawn taut by a suitable actuator which tightens the webbing between the headrest and the front of the seat. This action separates the flier positively at the appointed time and permits deployment of the flier's parachute without interference with the seat.

Therefore, it is a primary object of the present invention to provide a separation means for a seat and its occupant which forcibly urges the occupant from the seat regardless of load forces applied to the applicant.

It is another object of the present invention to provide a means for separating a seat from its occupant which is light in weight, automatic in operation and simple in construction avoiding the use of connectors or fastening means coupling the seat and occupant together.

It is still a further object of the present invention to provide a seat and occupant separating means which is positive in action in effecting the separation thereby eliminating the need for muscular effort on the part of the occupant to effect separation.

The foregoing and other objects and advantages of our invention will become apparent from an inspection of the following description and the accompanying drawings which describe and show, respectively, one embodiment of our invention. It should be appreciated, however, that our invention may exist in forms other than herein shown and described.

In the drawings:

FIGURE 1 is a side view illustrating a pilot or crew member and seat being ejected from an aircraft wherein the seat incorporates the present invention;

FIGURE 2 is a side view of the ejected pilot and seat of FIGURE 1 showing the pilot/seat separation means actuated to forcibly separate the pilot from the seat;

FIGURE 3 is a perspective view of the basic seat arrangement employed in FIGURES 1 and 2 in accordance with the present invention;

FIGURE 4 is a vertical sectional view of the actuator and gas generator assembly of the separation device taken in the direction of arrows 4—4 of FIGURE 1; and FIGURE 5 is a sectional view of the actuator taken in the direction of arrows 5—5 of FIGURE 4.

As shown in FIGURE 1, an airplane 10 is provided having a cockpit area 11 out of which an aircraft ejection seat is propelled in the direction of arrows 13. The seat is occupied by a flier 14 and is propelled out of the cockpit by means of a rocket propulsion unit 15. Seat 12 is equipped with knee-guards 16 located on either side of the seat adjacent the knees of the occupant so that the legs of the occupant are confined to the seat to avoid floundering. Also included on the seat 12 is a network of webbing 17 connected between the seat back 18, head rest 20, and knee protectors 16 to restrain the seat occupant's arms and torso equipment from floundering.

The back 18 of the seat 12 terminates in a bucket seat or pan 21 arranged to receive a flier's survival kit 22 and seat cushion 23. The survival kit and cushion are secured to the seat occupant by means of a lap strap or belt 24. The pilot, including the cushion and survival kit, are held in the bucket seat by means of a safety belt 25 which extends across the lap of the seat occupant and is secured on its opposite ends to the two sides of the seat. Normally, upon emergency exit and ejection of the seat and pilot, the safety belt 25 is severed by a pyrotechnic severing device (not shown) so that the occupant may separate from the seat.

FIGURE 1 further illustrates the seat 12 as having an occupant separation device which includes, in general, a flexible webbing network or strap means 26 attached at one end to the front of the seat at a point 27 and secured on its opposite end to a rotary actuator 28, to be described later. Actuator 28 is operated by a gas generator 30 by means of gases provided via a tube connection 31 from an explosive charge. While the flier remains seated in the seat 12, it is to be appreciated that the strap means 26 is in a position to follow the general line of the seat back and bucket seat 26 so that the strap means does not interfere with normal occupant ingress or egress from the seat.

With reference to FIGURE 2, the separation strap means 26 is drawn taut between the actuator 28 and the front of the seat 12 at point 27. The drawing of the strap means taut shortens its effective length and causes the positive separation of the flier 14 from the seat. Once the flier has been so separated, either manual or automatic means may be employed for deploying a flier's personal parachute 32. Prior to actuation of strap means 26, the safety belt initiator severs the safety belt 25 so that the pilot is uninhibited during separation.

With reference to FIGURE 3, it can be seen that the webbing or strap means 26 comprises a single web or strap 33 which is secured on one end to the rotary actuator 28 and is routed from the actuator half way down the forward face of the seat back. From this point P, two separate straps 34 and 35 continue down, pass under the occupant and the survival kit adjacent seat 26 to the forward bucket lip 36 where the ends of straps 34 and 35 are attached at points 27. From the point where straps 34 and 35 are attached to strap 33, straps 34 and 35 diverge in a general inverted V-shaped configuration. This point is reinforced by an additional section of webbing 37. Although the straps and webbing of means 26 may be made from any suitable material, it is preferred to employ nylon because of its high strength and light weight properties. It is noted that the strap connections at point 27 on seat lip 36 are of a loose and rotatable nature so that the straps may easily and readily be positioned to lie flat on the seat pan 26 or pulled taut, as shown in solid lines in FIGURE 3. In order to prevent straps 34 and 35 from separating during actuation and to maintain sufficient surface area in order to forcibly separate a seat occupant, a tie strap 40 is employed which is sewn between straps 34 and 35. It should be appreciated that other configurations of ties and webbing connections other than those shown can be employed without departing from the spirit of the present invention. Furthermore, strap 33 may be secured to the ends of straps 34 and 35 by any suitable fastening means such as by sewing, rivets, hooks, etc.

With reference to FIGURE 4, the strap means 26, actuator 28 and gas generator 30 is shown in section. In general, the gas generator 30 comprises a housing 41 which contains a conventional pyrotechnic cartridge 42. The cartridge is fired by means of a firing pin 43 movable in a chamber 44 leading to the cartridge. The firing pin is moved by means of initiating gases introduced via a gas initiation port 45 which receives the initiating gases from the safety belt initiator (not shown).

Resultant gases generated by the firing of cartridge 42 travel to actuator 28 via tube 31. Actuator 28 comprises, in general, a housing 46 having a cylinder 47 sealably secured on one end thereof through which a piston 48 travels linearly on a guide 49. Under piston 48 is a supply of hydraulic fluid. A spacer 50 is provided on the piston guide which prevents the piston from engaging with the inside end of cylinder 47 so that a chamber 51 is provided into which gases from the exploded cartridge 42 may be introduced.

Piston 48 travels on its fixed guide 49 when gases are introduced into chamber 51 such that the end of a piston shaft 52 carrying a coupling means 53 engages with a similar type coupling or connector on the end of a ball screw assembly shaft 54. About the periphery of the assembly, the upper end of strap or web 33 is rotatably secured. Upon the movement of piston 48 to the right as shown in FIGURE 4, the hydraulic fluid is forced out of blow-out plug 55 and the coupling means of both the piston shaft and ball screw assembly mate to rotate shaft 54 and convert the linear movement of piston 48 into rotary movement of shaft 54.

As shown in FIGURE 5, rotary movement of shaft 54 in a clockwise direction will cause the webbing 33 to be drawn into a general webbing storage area 56 provided within the housing 46 of the actuator via a slot 57.

Operational experience and early testing in the development of aircraft emergency ejection systems dictated the mandatory requirements for a device to forcibly separate the pilot or crew member from his seat after ejection has taken place. The system of the present invention consists of a gas generator 30 and a rotary actuator 28 for drawing the webbing network 26 taut. In a typical installation, the rotary actuator 28 is mounted beneath the headrest 20 on the back 18 of the seat 12. The webbing 26 includes a strap 33 which is attached to the rotary actuator reel or shaft 54 and extends behind and under the seat occupant and is attached to the forward lip 36 of the seat 12 at points 27.

Upon ejection, gas pressure from a safety or lock belt initiator (not shown) acts on the firing pin 43 of the gas generator and initiates the firing of the cartridge 42 in the gas generator. Resulting gases from the firing of the cartridge 42 flow through the tubing 31 into the chamber 51 of the rotary actuator 28 and act on the face of the piston 48. The resulting pressure in the hydraulic buffering fluid ruptures the separator disc 55 and permits passage of the hydraulic fluid through the orifice provided by the removal of plug 55, thereby controlling the rate of movement of the piston. Rotation of the piston during its linear movement is prevented by the piston guide 52. As the piston moves forward rotating the ball screw 54, the webbing is wound about the shaft assembly 54 as shown in FIGURE 5.

When the webbing is retracted, it becomes straight, extending from its attachment point on the front of the seat directly to the actuator. This in effect forms a right angle triangle of which the webbing is the hypotenuse and the back 18 and the pan 26 of the seat are the two legs. This action positively separates the occupant from the seat 12. During actual tests, the velocity of the webbing retraction is held to a maximum of 12 ft./sec. and is capable of being retracted against a 100 lb. mass against an 8 g opposing acceleration.

Having described only typical forms of the invention we do not wish to be limited to the specific details herein set forth, but wish to reserve to ourselves any variations or modifications that may appear to those skilled in the art and fall within the scope of the following claims.

What is claimed is:

1. An occupant and seat separation device for escape systems comprising, a basic seat having a back and seat pan secured to the back in fixed spaced relationship to accommodate a seated occupant, at least one strap extending along the general seat back and pan configuration disposed between the seat and the occupant, the strap having one end thereof attached to the front of the seat pan, and means attached to the seat for drawing the strap taut to forcibly expel the occupant from the seat.

2. An occupant and seat separation device for escape systems comprising, a basic seat having a back and seat pan secured to the back in fixed spaced relationship to accommodate a seated occupant, flexible webbing extending along the general seat back and pan configuration disposed between the seat and the occupant, the strap having one end thereof attached to the front of the seat pan, and means attached to the seat for selectively drawing the webbing taut to forcibly expel the occupant from the seat whereby the seat back, seat pan and webbing form a right triangle.

3. An occupant and seat separation device for escape systems comprising, a basic seat arrangement having a back and integral seat pan to accommodate a seated occupant, at least one strap means extending along the general seat back and pan configuration disposed between the seat and the occupant, one end of the strap means attached to the front of the seat pan, and means mounted on the seat back and attached to the other end of the strap means for drawing the strap taut by shortening its effective length to forcibly expel the occupant from the seat.

4. The invention as defined in claim 3 wherein the strap means includes a single flexible strap extending from the strap drawing means to the middle of the seat back and at this point the single strap being joined by a pair of divergent flexible straps terminating in a connection at the front of the seat pan.

5. An occupant and seat separation device for escape systems comprising, a basic seat arrangement having a back and integral seat pan to accommodate a seated occupant, flexible strap means extending along the general seat back and pan configuration disposed between the seat and the occupant and diverging from the top of the seat to the front of the seat pan to connect therewith, and means carried on the top of the seat back attached to the other end of the strap means for drawing the strap taut by shortening its effective length to forcibly expel the occupant from the seat.

6. An occupant and seat separation device for aircraft escape systems comprising, a seat ejectable from an aircraft having a back and a seat pan arranged to accommodate a seated occupant, flexible webbing extending along the seat back and seat pan disposed between the seat and its occupant and connected on one end to the front of the seat pan, an actuator carried on the seat back and operatively coupled to the free end of the webbing to effect drawing the webbing into the actuator, thereby shortening the effective length of the webbing and forcibly separating the occupant from the seat.

7. An occupant and seat separation device for aircraft escape systems comprising, a seat ejectable from an aircraft having a back and a seat pan arranged to accommodate a seated occupant, flexible webbing extending along the seat back and seat pan disposed between the seat and its occupant, the webbing diverging from the top of the seat back to a connection on the front of the seat pan, a rotary actuator carried on the seat back remote from the seat pan and operatively coupled to the free end of the webbing to effect winding the webbing into the actuator, thereby shortening the effective length of the webbing and forcibly separating the occupant from the seat.

8. The invention as defined in claim 7 wherein the webbing includes a single flexible strap extending from the actuator to the middle of the seat back and at this point the single strap being joined by a pair of divergent flexible straps terminating in connection with the front of the seat pan.

9. An occupant and seat separation device for aircraft escape systems comprising, a seat ejectable from an aircraft having a seat back, a head rest and a seat pan arranged to accommodate a seated occupant, flexible webbing extending along the seat back and seat pan disposed between the seat and its occupant and connected on one end to the front of the seat pan, a rotary actuator carried on the seat back adjacent the head rest and operatively coupled to the free end of the webbing to effect winding the webbing into the actuator, thereby shortening the effective length of the webbing and forcibly separating the occupant from the seat, and a gas generator coupled to the actuator for selectively operating the actuator whereby the seat back, seat pan and webbing form a right triangle.

References Cited in the file of this patent

UNITED STATES PATENTS

| 2,829,850 | Culver | Apr. 8, 1958 |
| 2,904,286 | Bleck | Sept. 15, 1959 |

FOREIGN PATENTS

| 531,184 | Great Britain | Dec. 31, 1940 |

OTHER REFERENCES

Western Aviation Magazine, June 1959, volume 39, No. 6, page 28 relied on.